United States Patent [19]
Nakamura et al.

[11] Patent Number: 5,131,074
[45] Date of Patent: Jul. 14, 1992

[54] KNOWLEDGE COMPILATION/PATTERN REASONING SYSTEM

[75] Inventors: Ken Nakamura; Yohichi Ageishi; Ryuji Horikawa; Hidetoshi Yamaguchi, all of Tokyo, Japan

[73] Assignee: Adin Research, Inc., Tokyo, Japan

[21] Appl. No.: 415,507

[22] Filed: Oct. 2, 1989

[30] Foreign Application Priority Data

Oct. 5, 1988 [JP] Japan ................. 63-251434

[51] Int. Cl.$^5$ .............................. G06F 15/18
[52] U.S. Cl. ................... 395/61; 395/900; 395/75
[58] Field of Search ........... 364/513; 395/61, 68, 395/75

[56] References Cited

U.S. PATENT DOCUMENTS 4,847,795  7/1989  Baker et al. ............... 364/579
4,924,408  5/1990  Highland .................. 364/513

OTHER PUBLICATIONS

Knight et al., "The Use of Expert Systems in Industrial Control", Measurement & Control, vol. 17, 1984, pp. 409–413.
Astrom et al., "Expert Control", Proc. Intl. Federation of Automatic Control, 1986, pp. 277–286.
Moore et al., "Expert Systems in On-Line Process Control", Chemical Abstracts, pp. 839–867.
Mamdani et al., "Process Control Using Fuzzy Logic",
Fuzzy Sets—Theory and Applications to Policy Analysis and Information Systems, 1980, pp. 249–265.
Psaltis et al., "A Multilayered Neural Network Controller", IEEE Control System Mag, Apr. 1988, pp. 17–20.
van Nauta Lemke et al., "Fuzzy PID Supervisor", Proc. 24th Conf. Decision and Control, Dec. 1985, pp. 602–608.

Primary Examiner—Michael R. Fleming
Assistant Examiner—Robert W. Downs
Attorney, Agent, or Firm—Armstrong, Nikaido, Marmelstein, Kubovcik & Murray

[57] ABSTRACT

A knowledge compilation/pattern reasoning system has two subsystems: a pattern generating subsystem for interpreting human representation of knowledge and physical models and transforming them into pattern data, and an executing subsystem for analyzing states by using the generated pattern data and decision criterion data. An operation system of the kind adopting pattern type reasoning may be loaded with only the executing subsystem which uses pattern data compiled by the pattern generating subsystem beforehand, for the purpose of implementing high-speed execution. Since the transformation of human representation of knowledge and physical models into pattern data is effected by the pattern generating subsystem which is independent of the executing system, human representation of knowledge and physical models and pattern data are desirably interfaced to each other.

6 Claims, 20 Drawing Sheets

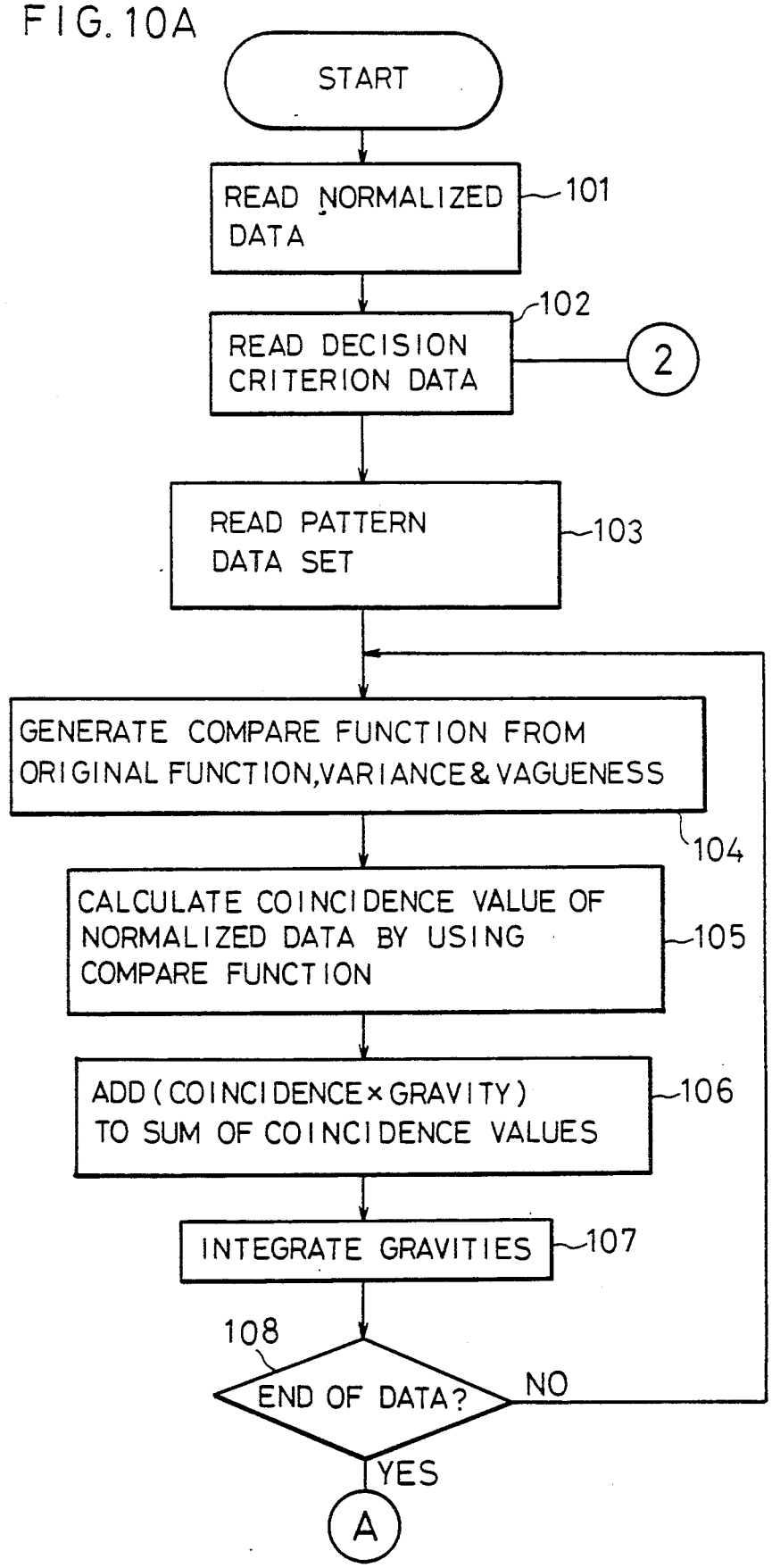

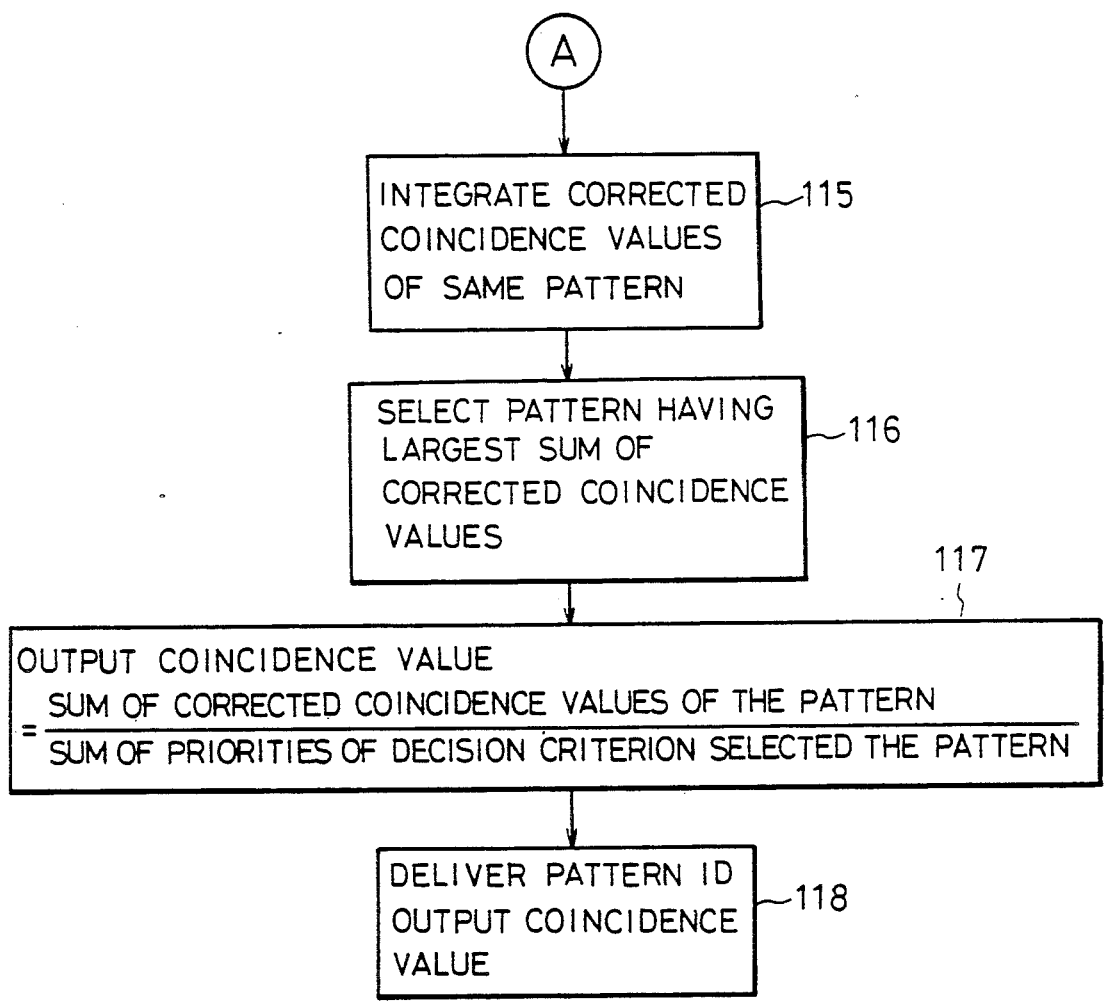

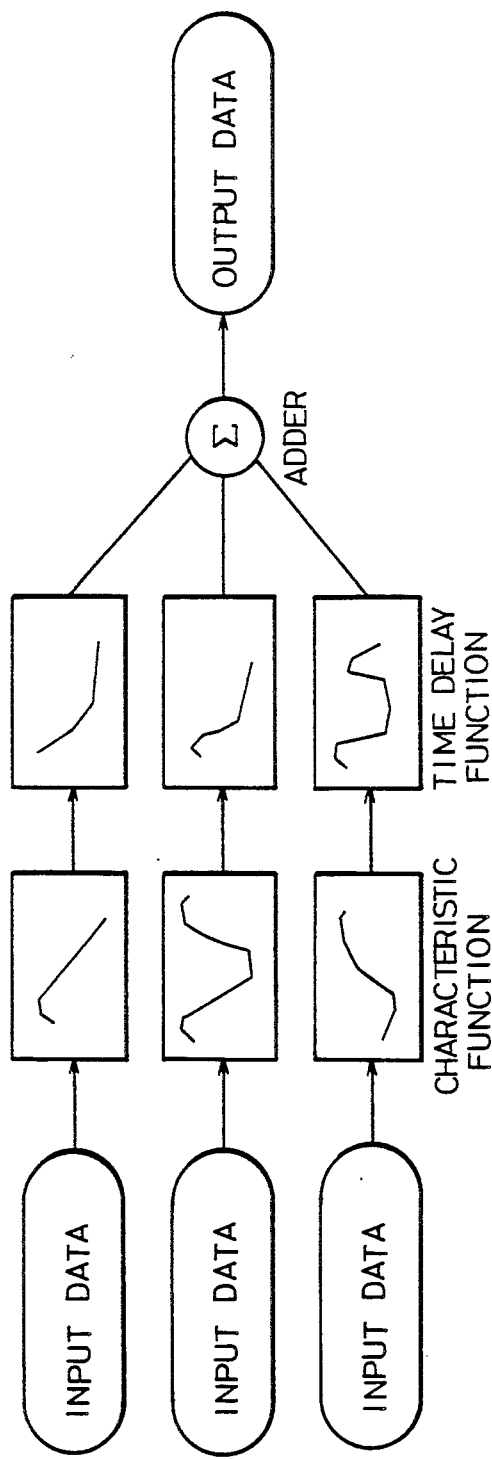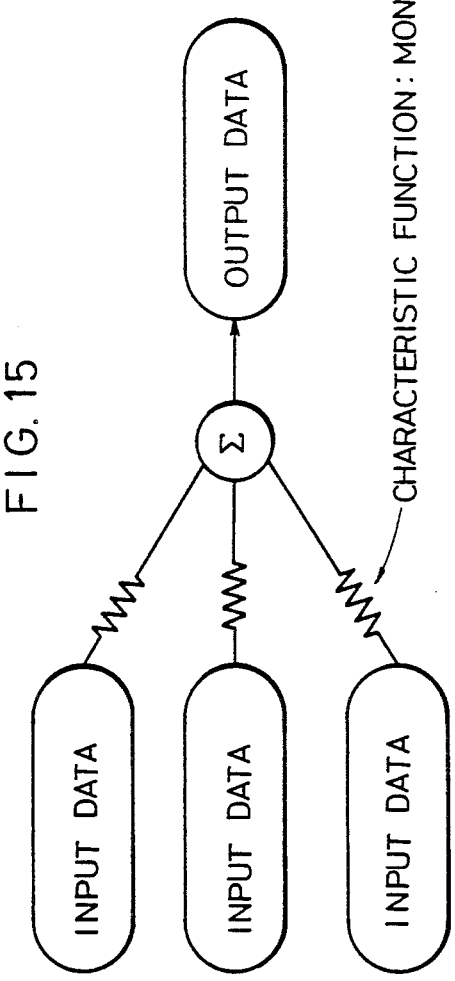

KNOWLEDGE COMPILATION/PATTERN REASONING SYSTEM

BACKGROUND OF THE INVENTION

The present invention generally relates to a processor responsive to a plurality of input signals for analyzing a state and transmitting an output signal associated with the state. More particularly, the present invention is concerned with a knowledge compilation/pattern reasoning system for a processor capable of implementing high-speed processing and efficient maintenance by using knowledge data which is generated by a separate apparatus by the conversion of knowledge data. The present invention is advantageously applicable, but not limited to, a control system of the kind having a plurality of input signals and needing rapid circumstantial judgement, e.g. a plant control system or a posture control system for a moving object.

Circumferential judgement systems of the kind using knowledge data heretofore proposed may generally be classified into two types, i.e., a type implementing reasoning which is analogous to the human reasoning system on a processor, and a type using a neural net model which simulates the human neuron net by software or hardware. A problem with the reasoning type system is that it basically is not suitable for a processor adopting a sequential processing principle and, therefore, an extremely long period of time is needed for execution. In addition, with such a system, it is impracticable to achieve parallel processing unless extra work such as elaborating the knowledge to describe or the reasoning procedure is performed to provide knowledge feasible for parallel processing. On the other hand, the neuron net type system basically adjusts the characteristic of an output relative to inputs on the basis of learning which relies on execution and evaluation. This system, therefore, cannot change the characteristic by using abstract knowledge, failing to promote efficient maintenance. Another drawback with the neuron net type system is that when the subject of analysis is complicated, the convergence of characteristic which relies on execution and evaluation becomes unstable.

The prior art reasoning type system is feasible for man-machine interface such as the description and updating of knowledge, but it is disadvantageous when it comes to processing rate. Conversely, the prior art neuron net model type system is advantageous regarding processing rate, but it is disadvantageous from the standpoint of stable characteristic and man-machine interface because the processing is implemented in a mode much removed from abstract knowledge.

As discussed above, the prior art technologies are dilemmatic with respect to processing rate and man-machine interface which involves stability of characteristic.

SUMMARY OF THE INVENTION

It is therefore an object of the present invention to provide a knowledge compilation/pattern reasoning system which is desirable in both processing rate and man-machine interface including a stable characteristic.

In order to achieve the above object, a knowledge compilation/pattern reasoning system of the present invention has two independent subsystems: a pattern generating subsystem for interpreting human representation of knowledge and physical models and transforming them into pattern data, and an executing subsystem for performing circumferential analysis by using the generated pattern data and decision criterion data.

An operation system of the kind adopting a pattern type reasoning principle may be loaded with only the executing subsystem which uses pattern data compiled by the pattern generating system beforehand, for the purpose of enhancing rapid execution. The transformation of human representation of knowledge and physical models into pattern data is performed by the pattern generating subsystem which is independent of the executing subsystem, whereby human representation of knowledge and physical models and pattern data are desirably interfaced to each other.

Errors which may occur during the generation of patterns and unpredictable changes in subject environments are accommodated by changing the criterion reference data of the executing subsystem.

In a preferred embodiment of the present invention, the pattern generating subsystem comprises a patterning rule generating section, a pattern data generating section, and a pattern data verifying section. The patterning rule generating section determines, by using data loaded in a knowledge database, the form of pattern data to be generated (format, total number and so forth of patterns) and the states to be indicated by individual patterns, and stores them in a patterning rule database. To determine the states to be indicated by individual patterns as mentioned above is to determine a rule for representing the state of an accident (dangerous state) such as the class of an accident (fire, gas leakage, electric leak, etc.), the phase of an accident, the kind, characteristics, locations and so forth of sensors used.

The pattern data generating section generates pattern data associated with the states represented by the patterns stored in the patterning rule database by forward reasoning, and stores them in a pattern database. The pattern data verifying section verifies the individual patterns stored in the pattern data base by backward reasoning and by using the data of the knowledge database and, if any of them is not consistent, corrects that pattern data.

In a preferred embodiment of the present invention, the executing subsystem is made up of an input normalizing section, a pattern comparing section, an output combining section, and a decision criterion changing section. The input normalizing system normalizes individual input data on the basis of input data normalizing tables. The pattern comparing section sequentially compares for each of the decision criterion data the normalized input data and comparison data sequences of the pattern database which are designated by search tables, calculates their coincidence values, and outputs a pattern having a large coincidence value and the coincidence value. The output combining section calculates corrected coincidence values by correcting coincidence value data, which the pattern comparing section outputs on a decision criterion basis, by use of a characteristic function, time delay function or similar correcting function, thereby selecting a pattern having a large coincidence value and a pattern class for the entire system while calculating their participation values. Here, the participation values are numerical values showing how far the individual decision criterion data have influence the selection of a pattern and a pattern class.

The input normalizing section may be constituted by input normalizers corresponding in number to input signals and operable in parallel with each other, while the pattern comparing section may be implemented by pattern comparators corresponding in number to the decision criteria and also operable in parallel. Such a specific configuration will be successful in increasing the processing rate.

The decision criterion changing section is triggered on the reception of evaluation data which is associated with the output data of the output combining section. In response, the decision criterion changing section changes the data of the individual decision criteria by using the input evaluation data and the participation values, while providing the decision criteria with a learning function.

BRIEF DESCRIPTION OF THE DRAWINGS

The above and other objects, features and advantages of the present invention will become more apparent from the following detailed description taken with the accompanying drawings in which:

FIGS. 10A and 10B are a flowchart showing the operation of the pattern comparing section schematically;

FIGS. 11A to 11C are a flowchart representative of the general operation of an output combining section also included in the executing subsystem;

FIG. 14 is a schematic block diagram representative of a procedure for calculating corrected coincidence values in the executing system;

FIG. 15 is a view similar to FIG. 14, showing a procedure for calculating corrected coincidence values particular to a prior art reasoning system;

DESCRIPTION OF THE PREFERRED EMBODIMENTS

A preferred embodiment of the present invention will be described which is applied to a security system by way of example. In the illustrative embodiment, pattern data, with which input signals (input values) are compared, consists of data referred to as a membership function and the data is represented by parameters such as a center value, a variance and a vagueness, and a search table. In other words, pattern data consist of center values of individual input signals each describing normalized data of the associated input signal, variances of individual input signals for changing the characteristic of an original function adapted for comparison, vaguenesses of individual input signals for changing the characteristic of the original function, and search tables describing the next comparison pattern which is associated with a pattern having the largest coincidence value at the moment. These pattern data are collectively shown below in Table 1.

TABLE 1

| | NAME | SYMBOL | NUMBER |
|---|---|---|---|
| CLASS PATTERN DATA | center value | P | input number/1 pattern |
| | variance | V | input number/1 pattern |
| | vagueness | Va | input number/1 pattern |
| | search table | Tb | 1/1 pattern |
| SEARCH TABLE | coincident pattern | ID | m constants/table |
| | next compare pattern | ID | n constants/table |
| CRITERION DATA | gravity | g | input number/1 criterion data |
| | charac function | Pr | 1/1 criterion data |
| | (priority in the embodiment) | | |
| | time delay function (not used in the embodiment) | | |

Figure 13A:
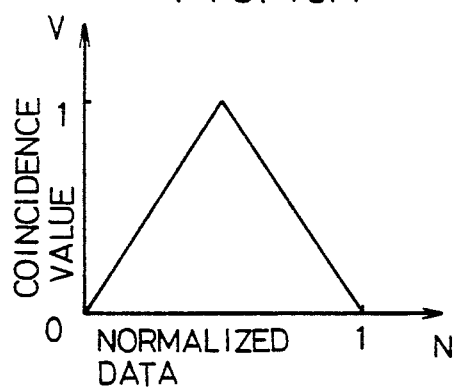
FIGS. 13A to 13D are graphs showing an original function and modifications thereof available with the embodiment applied to a security system.
Figure 13B:
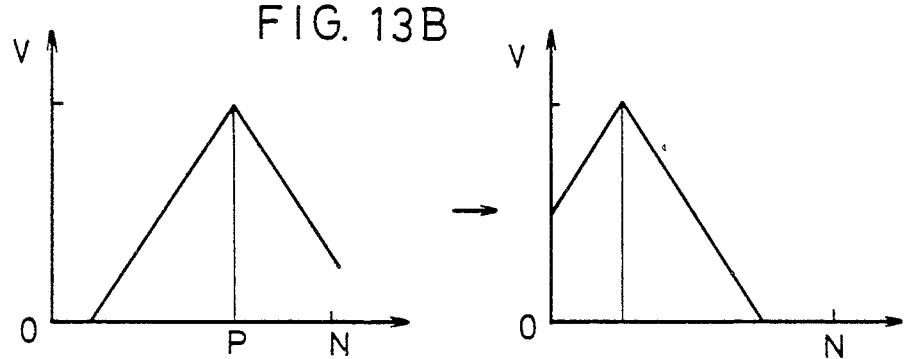
Figure 13C:
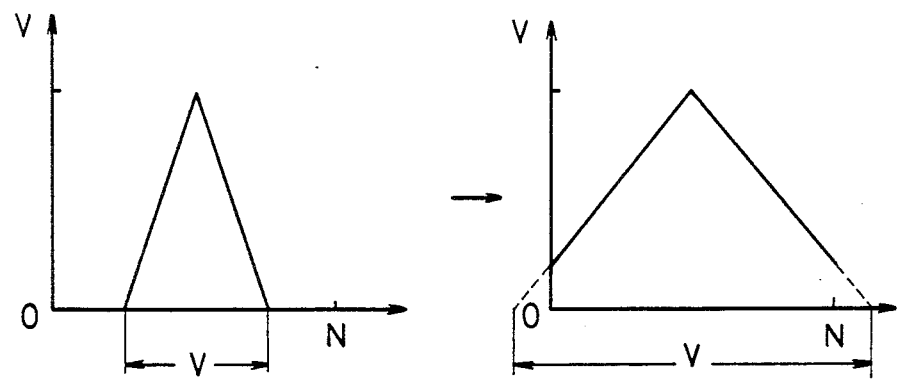
Figure 13D:
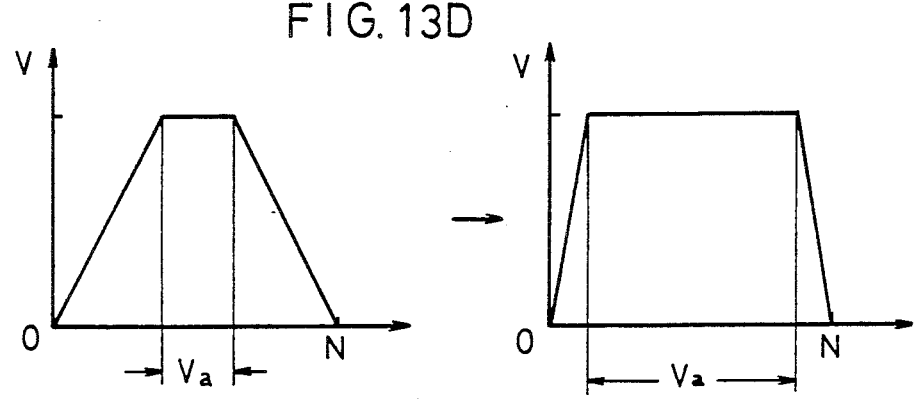

FIG. 13A is a graph showing one example of a comparison original function in the membership functions of this embodiment, in which the normalized data of the input signal (input value) is taken along the abscissa and the coincidence value is taken along the ordinate. FIG. 13B is a graph showing a variation of the comparison original function with a variation of the center value P which is the center value of the input values for determining the maximum coincidence value. FIG. 13C is a graph showing a variation of the comparison original function with a variation of the variance v which is the value representing the permissible range of the input values enable to obtain the coincidence value V. FIG. 13D is a graph showing a variation of the comparison original function with a variation of the vagueness Va.

As understood clearly from FIGS. 13A, 13B and 13D, each pattern representing a situation to be compared with the input value can be described by the center value P, the variance v and the vagueness Va.

As shown in Table 1, in this embodiment, criterion data for decision is made up of gravities of individual input signals each describing how far the associated input signal has influenced the decision, and priorities each describing how far the associated decision criterion has influenced the decision. The gravity (weight) is a numerical value indicating the degree of the influences of plural input signals 1, 2, 3 and 4 in each of criterions A, B, C and D, as exemplified in table 5 described later. The priorities are determined as the priorities of the criterions by giving weight to the plural criterions A, B, C and D, as exemplified in table 5.

Figure 1:
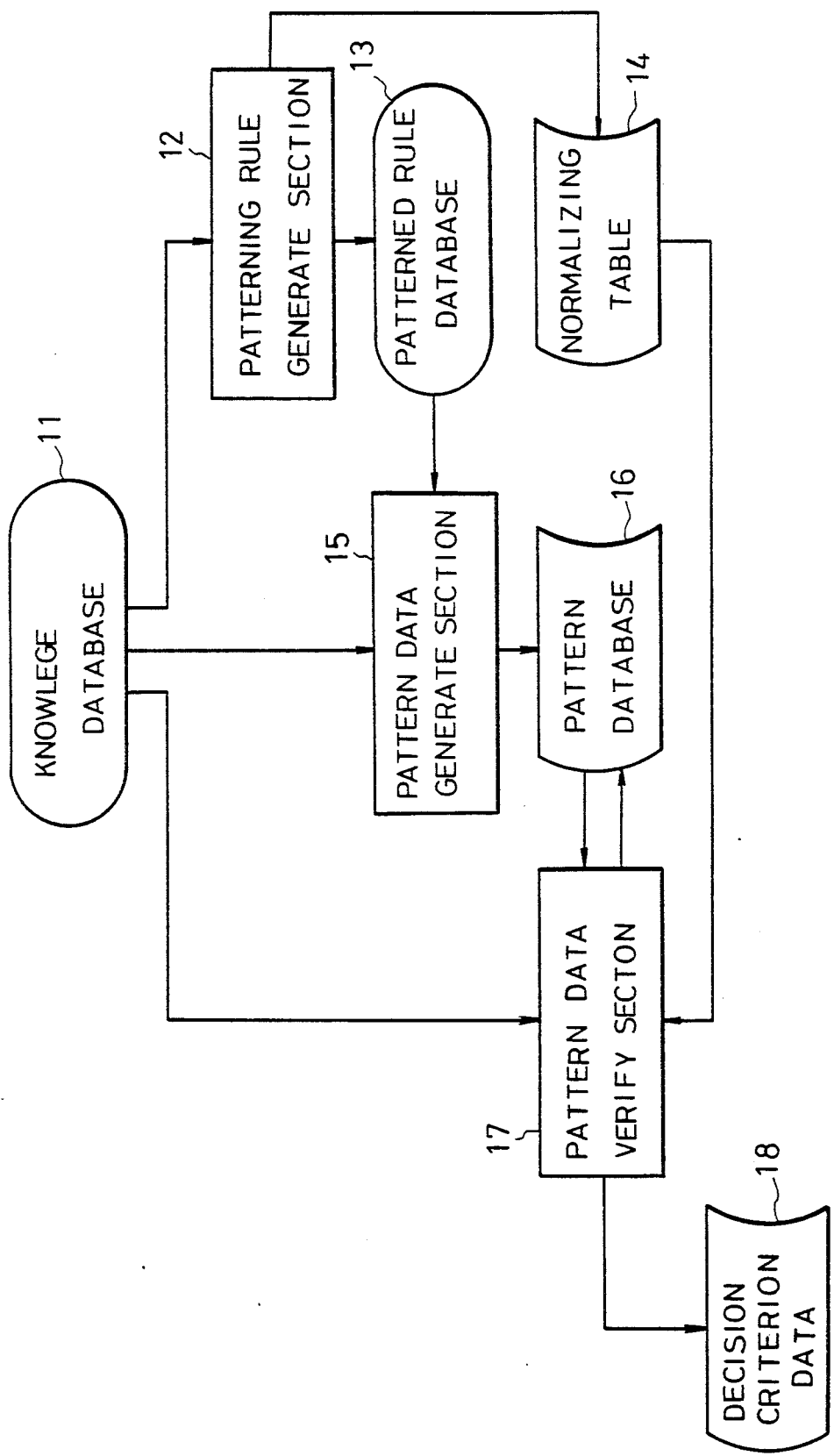
FIG. 1 is a schematic block diagram showing a pattern generating subsystem which forms a part of a knowledge compilation pattern reasoning system embodying the present invention.
Figure 2:
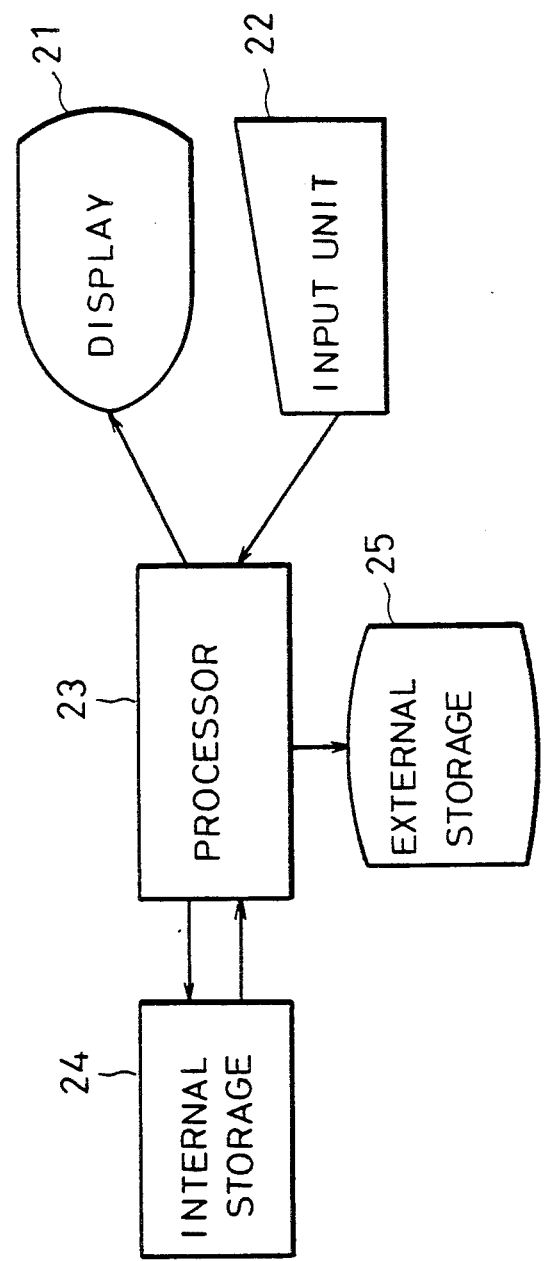
FIG. 2 is a schematic block diagram of the pattern generating system of the present invention which is applied to a security system.

FIG. 1 of the drawings shows a pattern generating subsystem which forms a part of the illustrative embodiment, while FIG. 2 schematically shows a specific construction of an apparatus for practicing the pattern generating subsystem. As shown in FIG. 2, the apparatus includes a display 21 and an input unit 22 which implement dialogue type man-machine processing. An operator enters knowledge data associated with the subjects of observation by using the display 21 and input unit 22. The entered data are sequentialy stored in a storage 24 built in the apparatus. Herein, the subjects of observation means the objects to be observed in order to attain the aim of a certain system, such as fire, gas leakage and electric leak in a security system. The states of the subjects of observation may be represented by various data. In the case of fire, it can be described how the states such as the occurrence or degree of fire vary with the temperature, humidity and the amount of dust in each room, outside ambient temperature, the amount of infrared ray, and the like. The states of the fire are output from the input unit 22 as knowledge data having a predetermined format.

A processing unit or processor 23 has a patterning rule generating section 12, a pattern data generating section 15 for generating pattern data, and a pattern data verifying section 17. In this embodiment, software is utilized as the means for realizing the functions of respective sections. In other words, the processing unit or processor 23 loads the programs associated with respective sections to the storage, reads each of the instructions in the loaded program in turn sequentially, and executes the read instructions sequentially, whereby realizing respective functions of the patterning rule generating section 12, the pattern data generating section 15 for generating pattern data, and the pattern data verifying section 17. For example, knowledge database 11 is loaded with various kinds of knowledge data such as sensors whose outputs are expected to change in the event of a fire, water leakage or similar emergency which may occur in a particular place, as well as the tendency of the change. By using such knowledge data, the patterning rule generating section 12 determines the format of pattern data to be generated, the total number of patterns and other similar forms, and the states each being indicated by a different pattern, and loads them in a patterning rule database 13. The states represented by the individual patterns are the rules for describing the classes of accidents (dangerous conditions) such as fire, gas leakage and electric leak which are the subject of observation in a security system, for example, the phases and locations of accidents, the number of comparison patterns and the comparison functions which are dependent on information associated with sensors used. The patterning rule database 13 may be understood as performing preliminary editing for producing comparison patterns from the knowledge database 11.

The patterned data generating section 15 generates pattern data associated with states which are represented by patterns stored in the patterning rule database 13, by forward reasoning based on the data of the knowledge database 11. The pattern data verifying section 17 verifies the pattern data stored in the pattern database 16 by backward reasoning which also uses the data of the knowledge database 11, and if any of them is not consistent the verifying section 17 corrects it.

The pattern generating subsystem having the above construction will be operated as follows.

Figure 3:
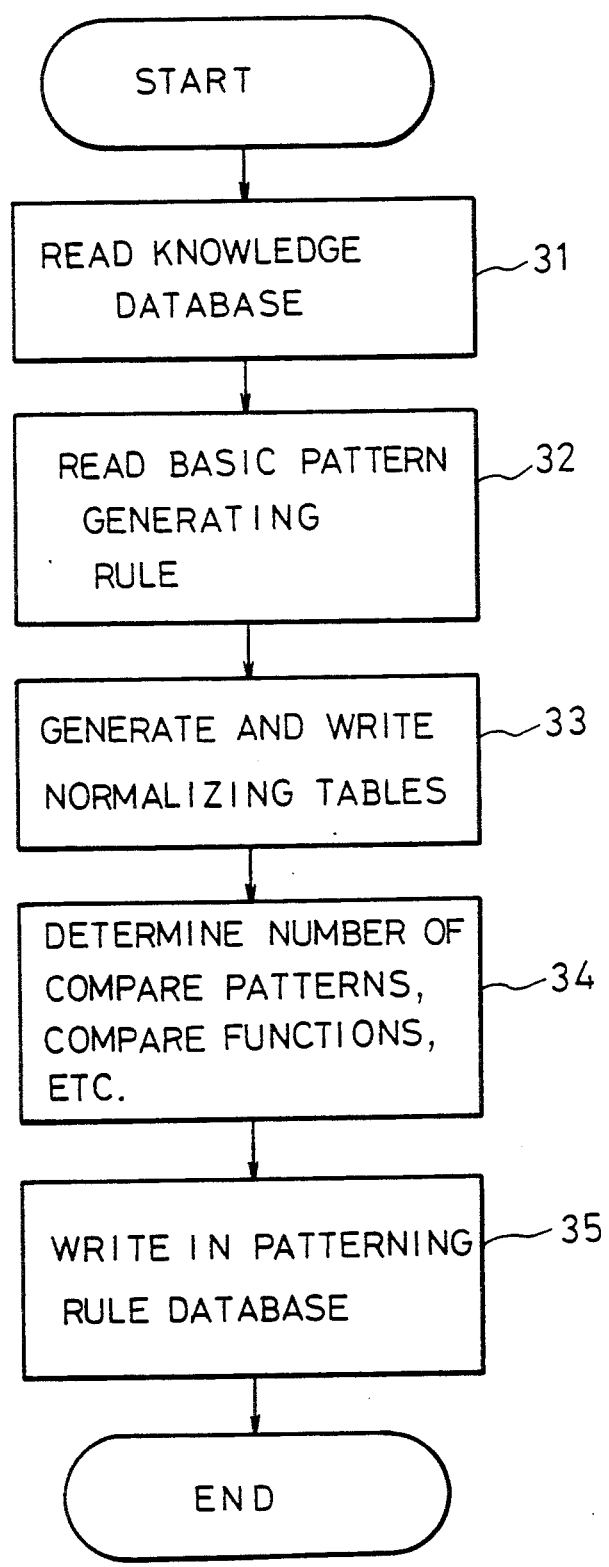
FIG. 3 is a flowchart outlining the operation of a patterning rule generating section which is included in the pattern generating system.

FIG. 3 is a flowchart outlining the operation of the patterning rule generating section 12. As shown, the operation begins with steps 31 and 32 for reading knowledge data and a basic pattern generating rule out of the knowledge database 11. The basic pattern generating rule is to describe a rule for determining, for example, the number of the comparison patterns in accordance with the number of sensors (input signals) used, the number of the functions to be prepared in accordance with the precision of the sensors, and the like, as an "if . . . then" type rule. Based on the knowledge data and basic pattern generating rule, the patterning rule generating section 12 prepares normalizing tables and loads them in an external storage 25 (step 33). As shown in table 6, the normalizing table is a translating table in which a translating rule is defined for translating input numerical value data into another numerical value data within the predetermined range. In this way, a pattern comparing described later can be performed in the same pattern compare section even if a signal of a different kind is input, by normalizing the numerical value data of the input signals using the normalizing table. Further, the pattern rule generating section 12 determines the number of comparison patterns, comparison functions and so forth which should be prepared in association with the individual states, while loading them in the patterning rule database 13 (steps 34 and 35). For example, when the object of the observation is fire and the states of the fire is classified into four phases, the number of comparison patterns is determined as 4 corresponding to respective phases, and the comparison function to be used is determined from the knowledge data in each phase. Herein, the scale of fire means the size or the extent of fire such as small-scale fire, middle-scale fire, large-scale fire for the whole building.

Figure 4:
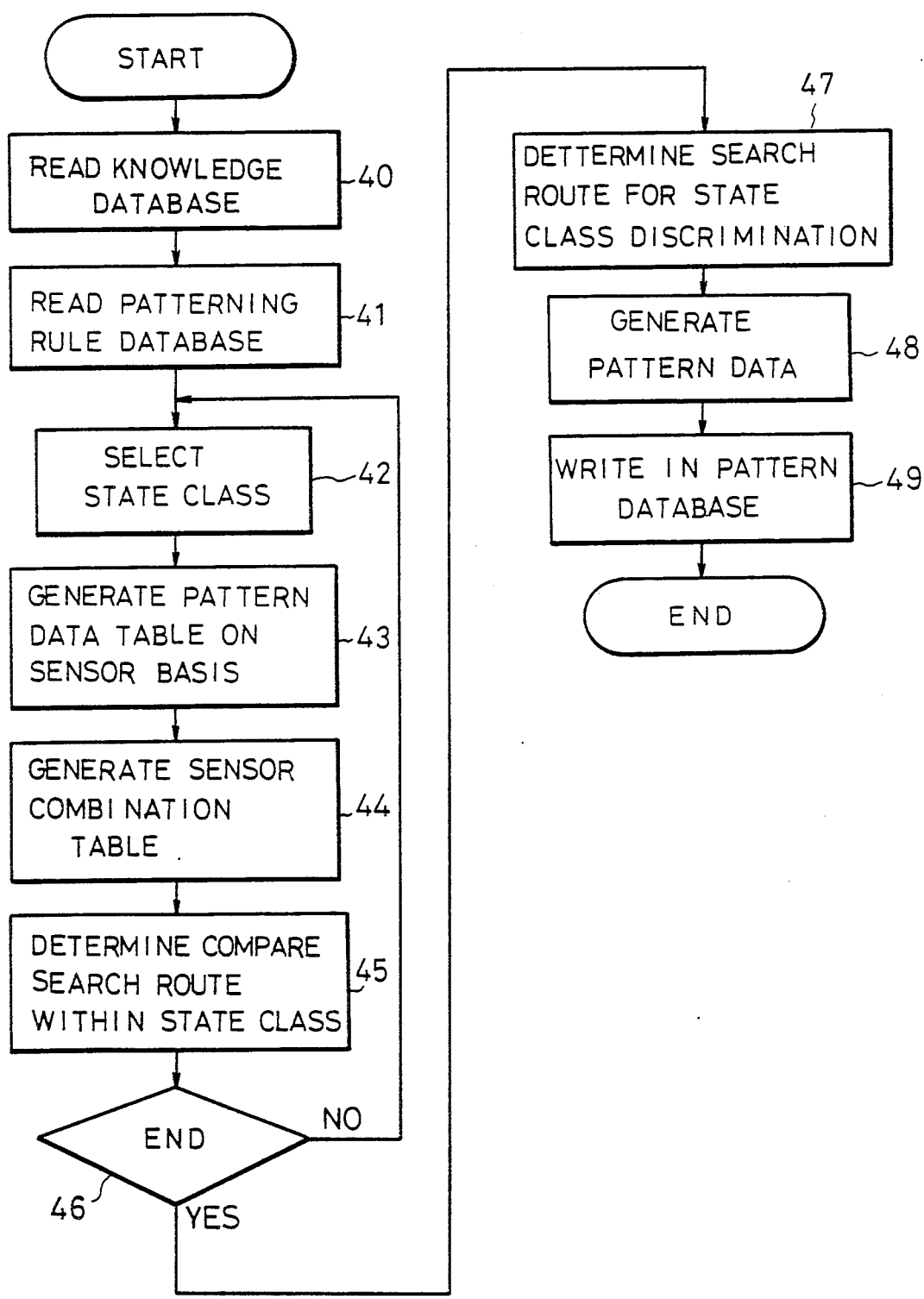
FIG. 4 is a flowchart demonstrating the operation of a pattern data generating section of the pattern generating system schematically.

Referring to FIG. 4, the operation of the patterned data generating section 15 will be described. First, the patterned data generating section 15 reads knowledge data out of the knowledge database 11 (step 40), reads the patterning rule out of the patterning rule database 13 (step 41), and then selects a class of occurrence to be detected, e.g. fire or water leakage (step 42). Based on the number of comparison patterns, a comparison function and so forth indicated by the patterning rule, the section 15 prepares a pattern data table for each of the sensors used, as shown in Table 2 (step 43).

TABLE 2

| PHASE OF FIRE | Sensor #1 PATTERN |
|---|---|
| ① | $P_1, V_1, Va_1$ |
| ② | $P_2, V_2, Va_2$ |
| ③ | $P_3, V_3, Va_3$ |
| ④ | $P_4, V_4, Va_4$ |

In Table 2 which is a specific example of pattern data tables, a sensor #1 is responsive to fires, and fires are identified with respect to four consecutive phases. Each of the phases is distinguished from the others in terms of a center value, a variance, and a vagueness.

Since a plurality of sensors are assigned to each class of occurrence to be detected, the patterned data generating section 15 prepares a table showing the combinations of sensors which should respond together to different phases of occurrence, as shown below in Table 3 (step 44).

TABLE 3

|  | SENSOR USED | | | |
| --- | --- | --- | --- | --- |
|  | #1 | #2 | #3 | #4 |
| PHASE OF FIRE ① | ○ | ○ | ○ | ○ |
| ② | ○ | ○ | ○ | ○ |
| ③ | ○ |  | ○ | ○ |
| ④ | ○ |  | ○ |  |

Subsequently, the patterned data generating section 15 determines a comparison search route in the plurality of comparison patterns as prepared by the steps 43 and 44, i.e., the order in which the patterns to be compared should be selected. The sequence of steps 42 to 45 stated above is repeated for all the classes of subjects of observation. On confirming the end of such a procedure (step 46), the section 15 determines a search route for a class distinction pattern (step 47). By using the data provided by the above steps, the section 15 generates pattern data (step 48) and writes them in a pattern database area of the external storage 25 (step 49). The pattern data so generated may be formed such as shown in Table 4.

TABLE 4

| PATTERN NAME | No. 3 | | |
| --- | --- | --- | --- |
| CLASS | FIRE LOCATION A PHASE 3 | | |
| INPUT | CENTER VALUE P | VARIANCE V | VAGUENESS a |
| #1 | +40 | ±15 | 10 |
| #2 | +20 | ±15 | 5 |
| #3-#1 | +20 | ±15 | 5 |
| • | • | • | • |
| • | • | • | • |
| NEXT SEARCH PATTERN | No. 4 | | |

Figure 5:
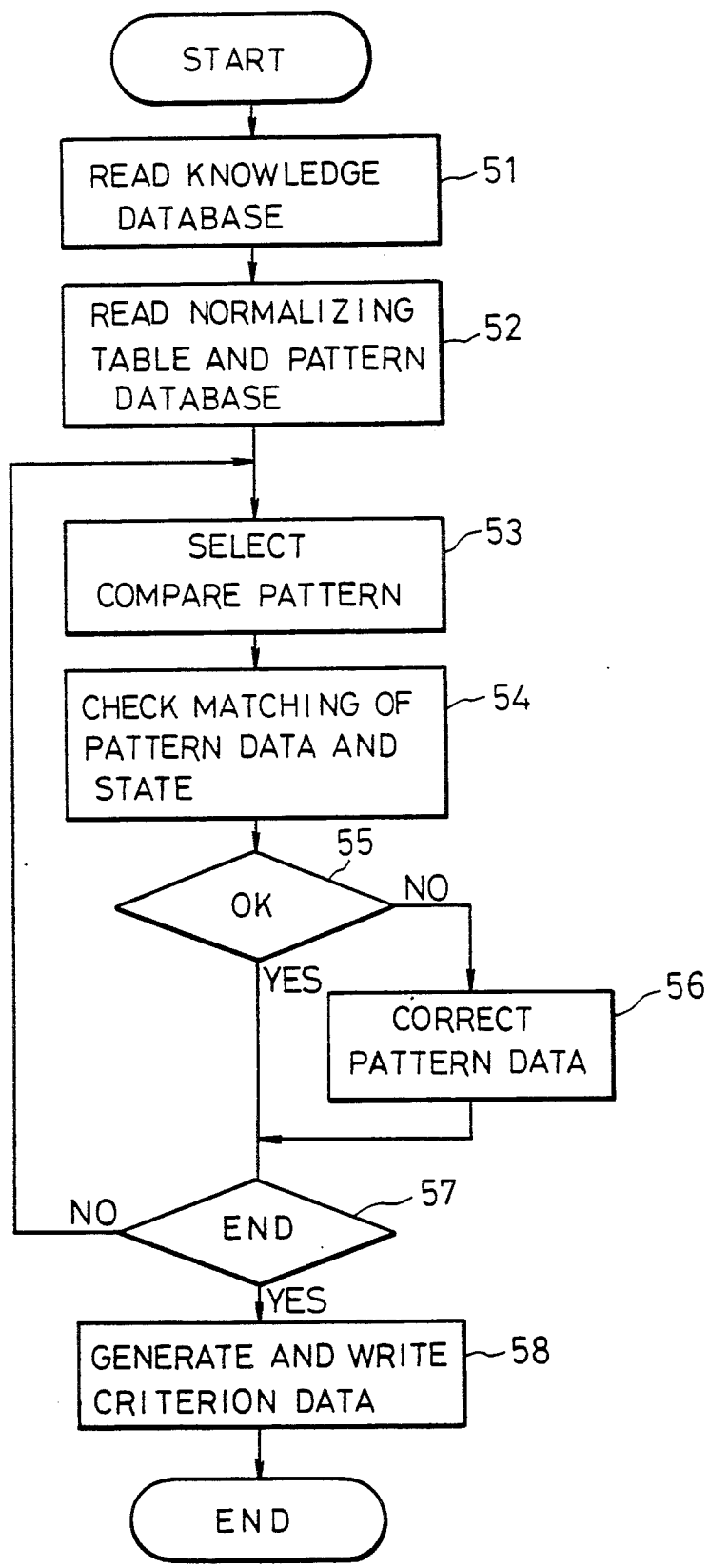
FIG. 5 is a flowchart showing the general operation of a pattern data verifying section of the pattern generating system.

FIG. 5 indicates the operation of the pattern data verifying section 17 in a flowchart. First, the data verifying section 17 reads the knowledge database 11 for verification (step 51). This is followed by a step 52 for reading the pattern database 16 to be verified, and normalizing tables for restoring the normalized pattern data to original. The section 17 selects the pattern data one at a time (step S53), transforms the selected pattern data into real data by using the normalizing table, and compares a state represented by the real data and a state represented by the knowledge data (step 54). If the two states compare equal, the section 17 verifies the next pattern data; if otherwise, it corrects the pattern data based on the knowledge data (step 56). On completing the verification with all the data (step 57), the section 17 generates and writes criterion data for decision (step 58). The decision criterion data include the names of criteria, priorities, and gravities assigned to the individual data elements (inputs). These data may be provided in a format as shown in Table 5 by way of example.

TABLE 5

| CRITERION NAME | GRAVITY g | | | | PRIORITY Pr | (CHARAC FUNCTION) |
| --- | --- | --- | --- | --- | --- | --- |
|  | INPUT 1 | INPUT 2 | INPUT 3 | INPUT 4 |  |  |
| CRITERION A | $g_{A1}$ | $g_{A2}$ | $g_{A3}$ | $g_{A4}$ | $Pr_A$ |  |
| CRITERION B | $g_{B1}$ | $g_{B2}$ | $g_{B3}$ | $g_{B4}$ | $Pr_B$ |  |
| CRITERION C | $g_{C1}$ | $g_{C2}$ | $g_{C3}$ | $g_{C4}$ | $Pr_C$ |  |
| CRITERION D | $g_{D1}$ | $g_{D2}$ | $g_{D3}$ | $g_{D4}$ | $Pr_D$ |  |

Figure 6:
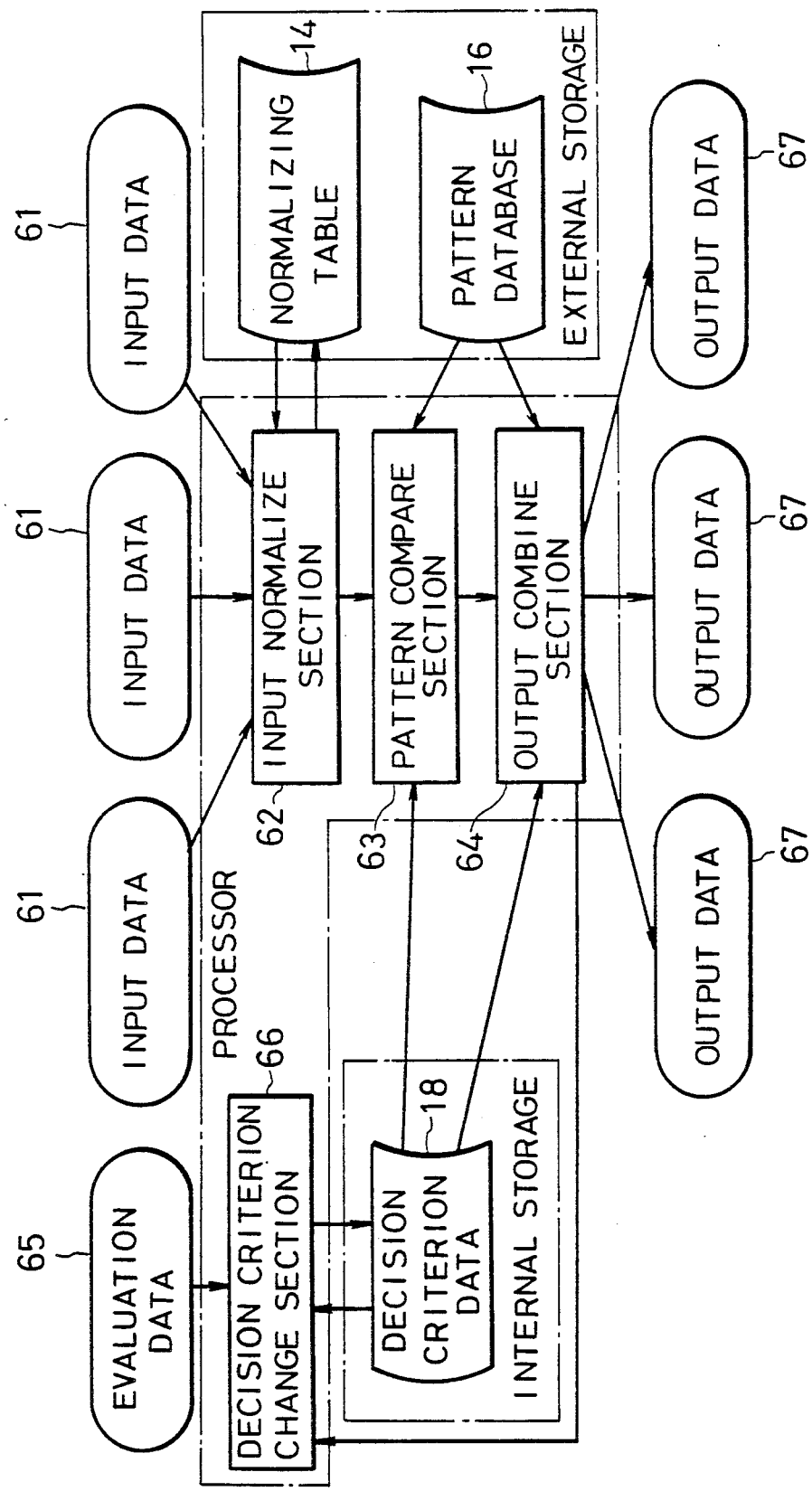
FIG. 6 is a schematic block diagram showing an executing subsystem which forms the other part of the present invention and is also applied to a security system.

Referring to FIG. 6, an executing subsystem forming the other part of the illustrative embodiment is shown in a schematic block diagram. As shown, an external storage has the pattern database 16 and normalizing tables 14 which were prepared by the pattern generating subsystem. An internal storage is available for storing the decision criterion data 18 generated by the pattern generating subsystem and for saving input data 61 for a moment. A processor has an input normalizing section 62, a pattern comparing section 63, an output combining section 64, and a decision criterion changing section 66. With these sections, the processor normalizes input data, compares patterns, and combines outputs by using the data loaded in the external and internal storages. In this embodiment, software is utilized for realizing the functions of respective sections 62, 63, 64 and 66. In other words, the processing unit or processor 23 loads the programs associated with respective sections to the storage, reads each instruction in the loaded program in turn, and executes the read instructions sequentially, whereby realizing respective functions of the input normalize section 62, pattern compare section 63, output combine section 64, and decision criterion change section 66.

Figure 9:
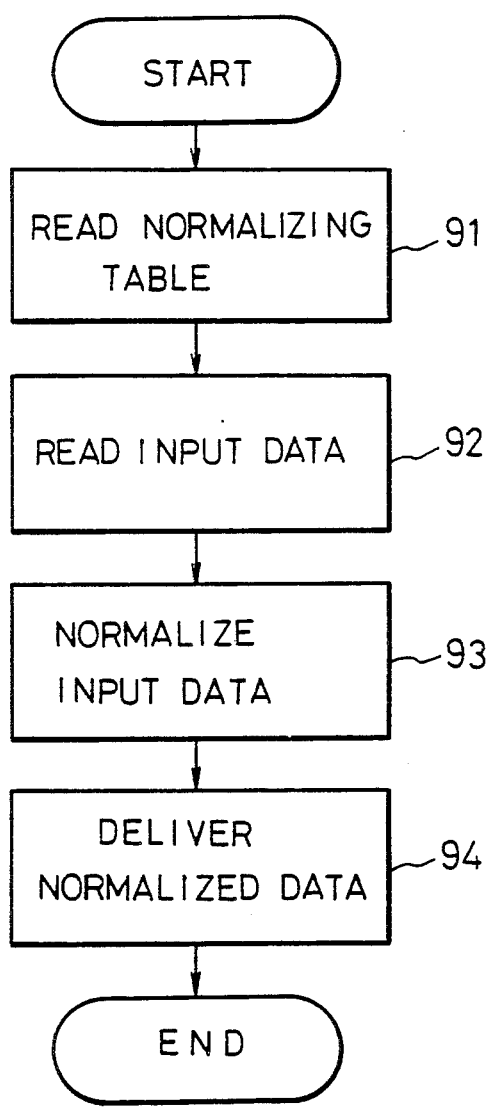
FIG. 9 is a flowchart outlining the operation of an input normalizing section included in the executing subsystem.

The input normalizing section 62 receives various input data 61 representative of the subjects of observation, e.g., indoor and outdoor temperatures, amounts of dust and gas leakage in the case of a fire-alarm system based on the normalizing tables 14. The normalized data is output in the form of patterns. FIG. 9 shows such a procedure. As shown, the section 62 normalizes each input data based on the data of the assigned normalizing table 14, formats the normalized data for comparison which will follow, and then delivers them to the pattern comparing section 63 (steps 91 to 94). A specific normalizing table which is assigned to indoor temperature is shown in Table 6 below.

TABLE 6

| NUMERICAL DATA | PATTERN DATA |
| --- | --- |
| 80° C. → | +100 |
| 55 → 80° C. | +45 → +100 |
| 35 → 55° C. | +15 → +45 |
| 20 → 35° C. | 0 → +15 |
| 20 → 5° C. | 0 → −15 |

By the normalizing table, temperatures of 20° C. to 5° C. are converted into a range of numerical values 0 to −15, temperatures of 20° C. to 35° C. are converted into a range of numerical values 0 to +15, temperatures of 35° C. to 55° C. are converted into a range of numerical values +15 to +45, temperatures of 55° C. to 80° C. are converted into a range of numerical values +45 to +100, and temperatures above 80° C. are converted into a numerical value 100 collectively.

Figure 10B:
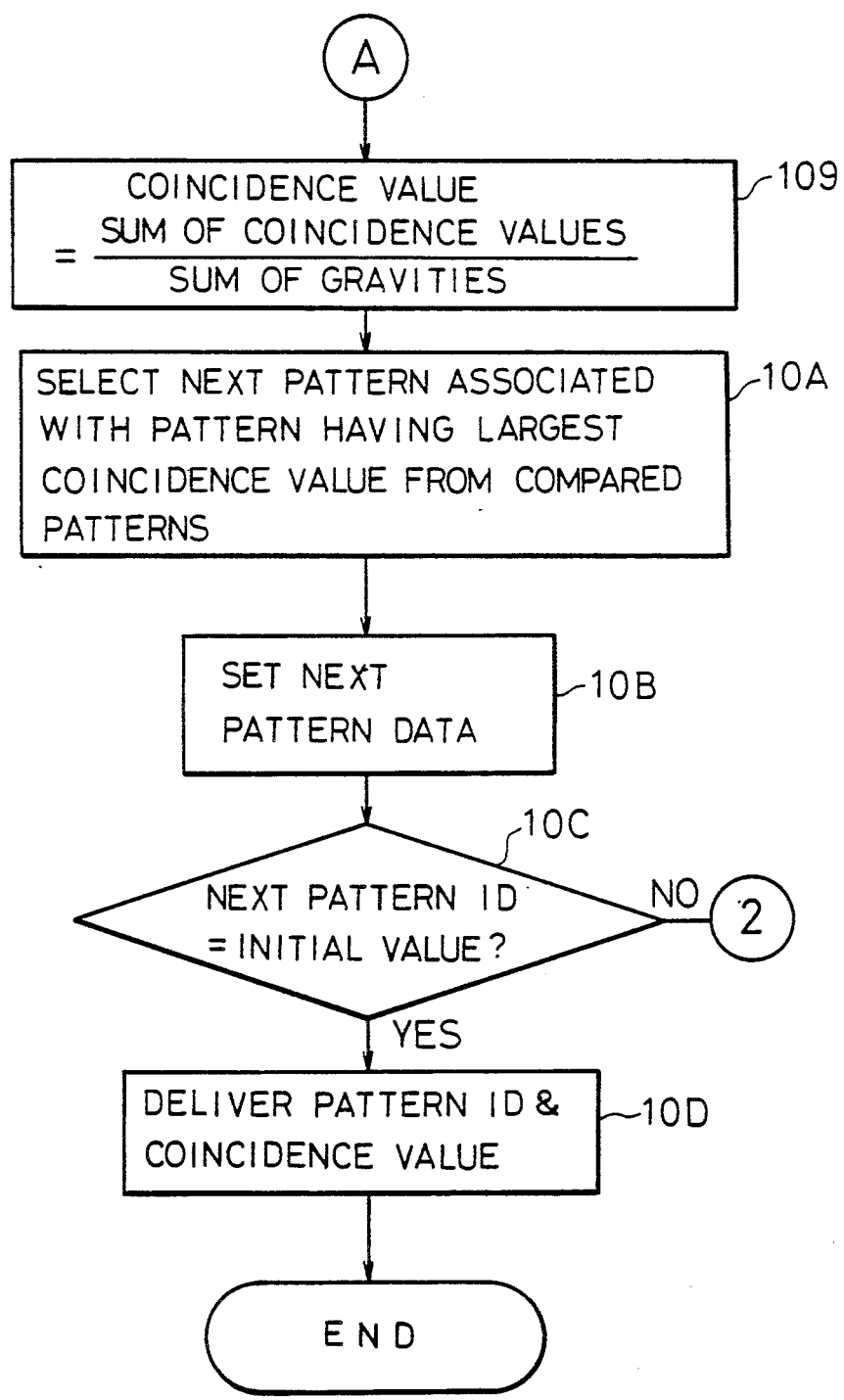

The pattern comparing section 63 sequentially compares, on a decision criterion data basis, the normalized input data and the comparison data trains stored in the pattern database 16 which are indicated by the search tables written in the pattern data and the decision criterion data. Based on the resulting coincidence values, the section 63 outputs a number assigned to a particular pattern having the largest coincidence value and the coincidence value. Such a sequence of steps is shown in FIG. 10. As shown, the section 63 receives normalized input data from the input normalizing section 62 while reading pattern data out of the individual storages (steps 101 to 103).

A comparison pattern, namely a comparison function {f1 (p), f2 (v), f3 (va)F} (N) is generated by using a predetermined original function F (N) and the center values P, variances V and vaguenesses Va of pattern data (step 104). FIGS. 13A to 13D depict examples of modification of original function which may be effected to generate a comparison function F (N). Specifically, FIG. 13A shows the original function F (N), while FIGS. 13B to 13D show respectively the modifications of the original function which use the center value p, the variance v, and the vagueness va.

The coincidence values of the normalized data are calculated by using the generated comparison function (step 105). This is followed by a step 106 for adding (coincidence value×gravity) to the sum of the coincidence values (step 106). Then, the gravities are integrated, i.e., $\Sigma g_i$ is produced (step 107).

Whether or not the processing has been completed with all of the input data is determined (step 108). If the answer of the step 108 is YES, the sum of coincidence values produced in the step 106 is divided by the sum of gravities produced in the step 107 so as to obtain a coincidence value V which is a weighted average (step 109). In this step, the following equation representative of a coincidence value V is fully calculated:

$$V = \frac{\sum_i [\{f3(va_i(va_i)) \cdot f2(v_i) \cdot f1(p_i) \cdot F\}(N) \times g_i]}{\sum_i g_i}$$

Thereupon, among the compared patterns, a number n assigned to a pattern which immediately follows the pattern having the largest coincidence value (next pattern ID) is selected from the search table associated with that pattern (step 10A), and pattern data corresponding to the pattern number n is set (step 10B). Whether or not the pattern number n is the initial value is determined to see if all the patterns have been compared (step 10C). If the answer of the step 10C is NO, the program returns to the step 103 for repeating the comparison. If the answer of the step 10C is YES, a number m assigned to the pattern having the largest coincidence value as determined in the step 10A is output together with the coincidence value as a result of comparison (step 10D).

Figure 11A:
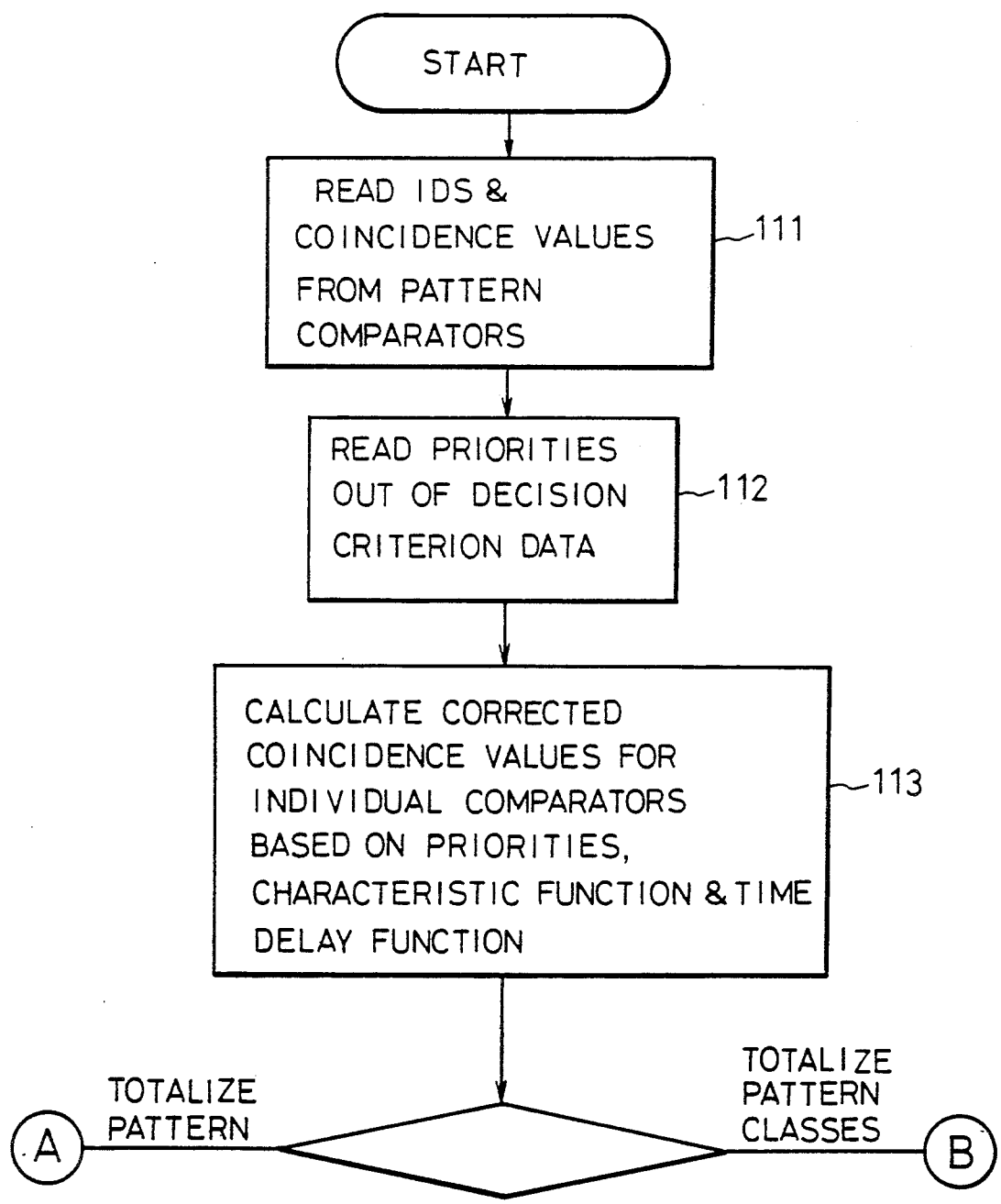
Figure 11C:
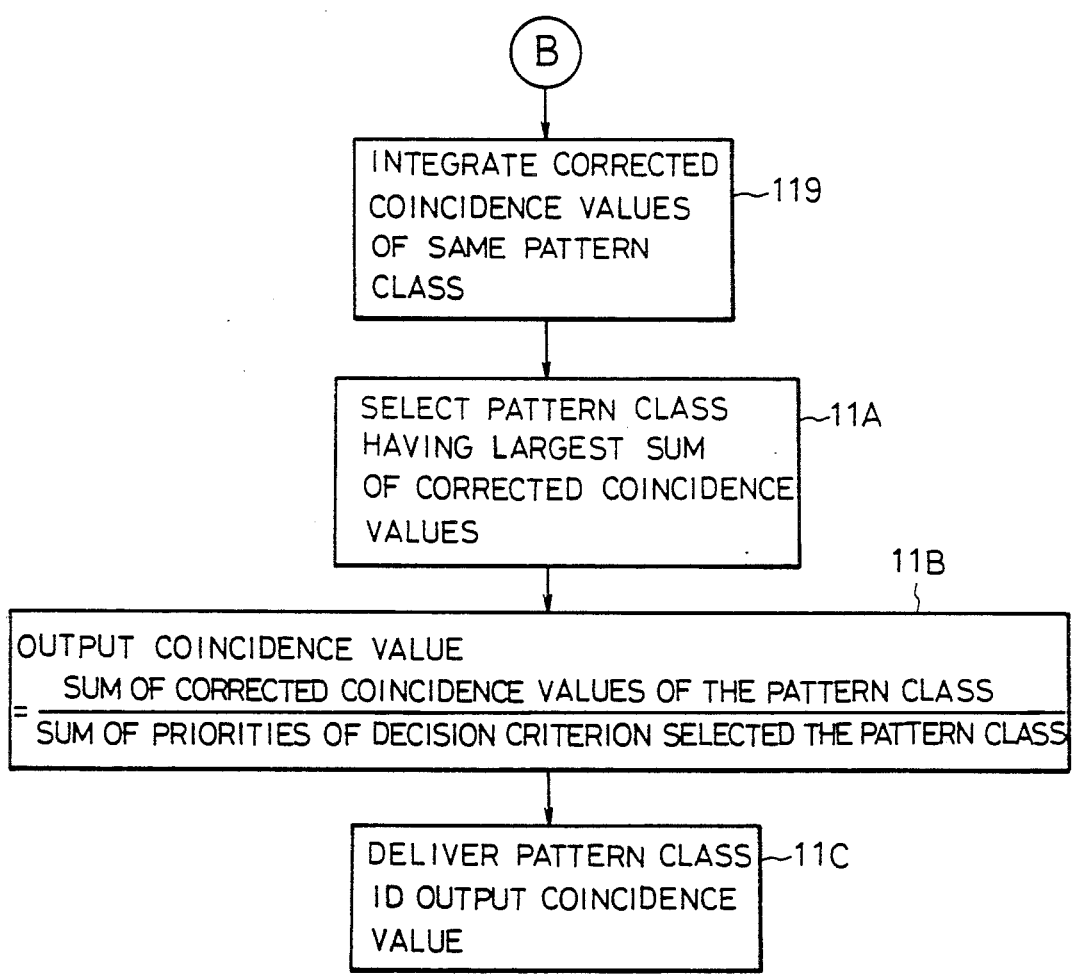
Figure 16:
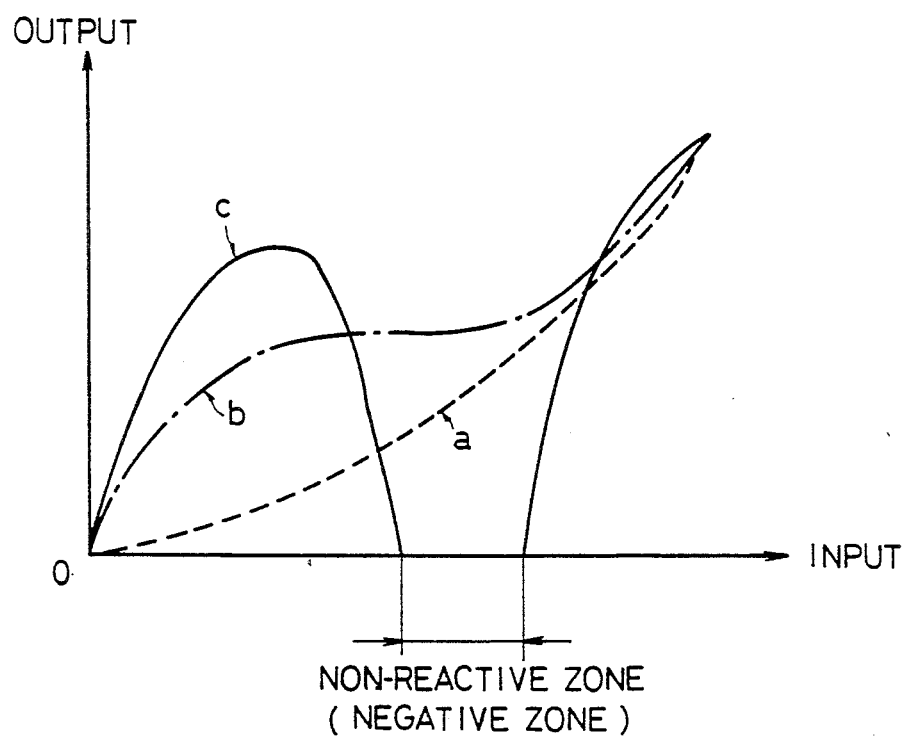
FIG. 16 is a graph showing a specific characteristic function applicable to the executing subsystem.
Figure 17:
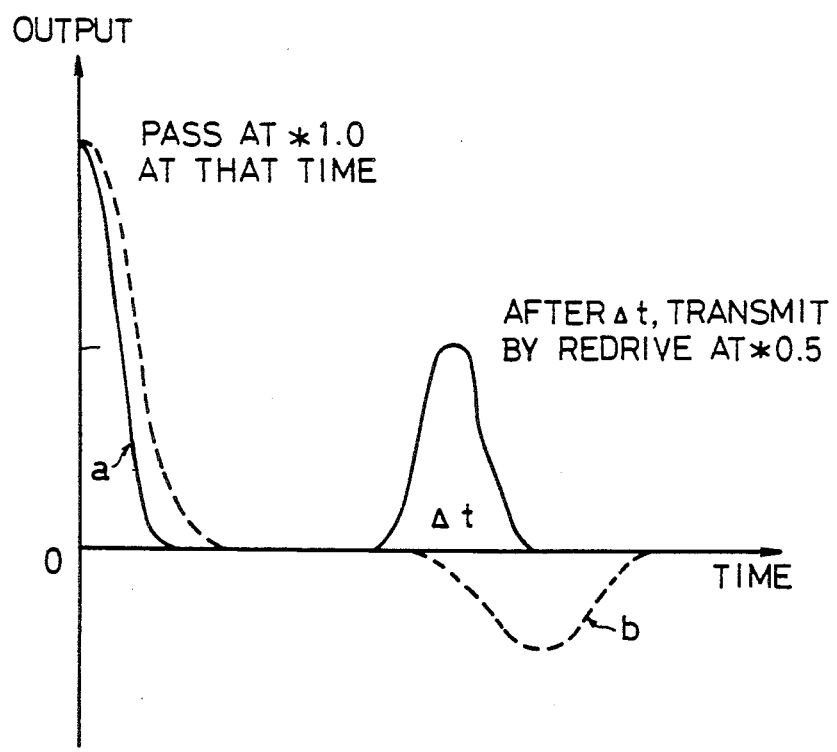
FIG. 17 is a graph showing a specific time delay function also applicable to the executing subsystem.

The output combining section 64 calculates corrected coincidence values by using the data, characteristic function and time delay function which are produced on a decision reference basis. By using the resulting corrected coincidence values, the section 64 calculates and outputs pattern numbers having large coincidence values, pattern classes and their coincidence values, and pattern numbers of the individual decision criterion data as well as participation values which are associated with the selection of the pattern classes. FIG. 11 demonstrates the procedure executed by the output combining section 64 as stated above. As shown, the section 64 reads pattern numbers and coincidence values out of the pattern comparing section 63 (step 111) while reading priorities out of the decision criterion data 18 (step 112). Then, the section 64 calculates corrected coincidence values for each of the decision criterion data by using the characteristic function (including priority value) and time delay function (step 113). Examples of the characteristic function and time delay function are shown in FIGS. 16 and 17, respectively. As shown in FIG. 15, the characteristic function available with a prior art neuron net model has been limited to either a monotonous incremetal function or a constant. In contrast, the illustrative embodiment implements not only a monotonous increment as represented by a curve a or b in FIG. 16 but also a characteristic including a non-reactive zone as represented by a curve c. Moreover, as shown in FIG. 17, the illustrative embodiment allows the use of a time delay function which drives again on the lapse of a predetermined period of time as indicated by a curve a, or even the transmission which is delayed by negative bias as indicated by a curve b. In this manner, the embodiment shown and described provides unprecedented diversity to the decision.

The patterns and the pattern classes are individually totalized based on the calculated coincidence values. Specifically, concerning the pattern totalization, the corrected coincidence values associated with the same patterns are integrated (step 115), and a pattern having the largest corrected coincidence value is selected (step 116). Then, an output coincidence value is produced by:

output coincidence value =

$$\frac{\text{sum of corrected coincidence values of pattern}}{\text{sum of priorities of criterion selected pattern}}$$

The resulting coincidence value is output together with the pattern number (step 118).

The pattern classes are totalized in the same manner as the patterns as totalized by the steps 115 to 118.

The reference changing section 66 is activated on the reception of evaluation data associated with the output data. Specifically, the section 66 changes the data of the individual decision criteria by using the patterns of the individual decision criterion data as well as their participation values associated with the selection of pattern class. It is to be noted that the participation values refer to the extents to which the individual decision criterion data have influenced the selection of patterns and pattern class, and they are proportional to (coincidence value×priority).

Figure 12:
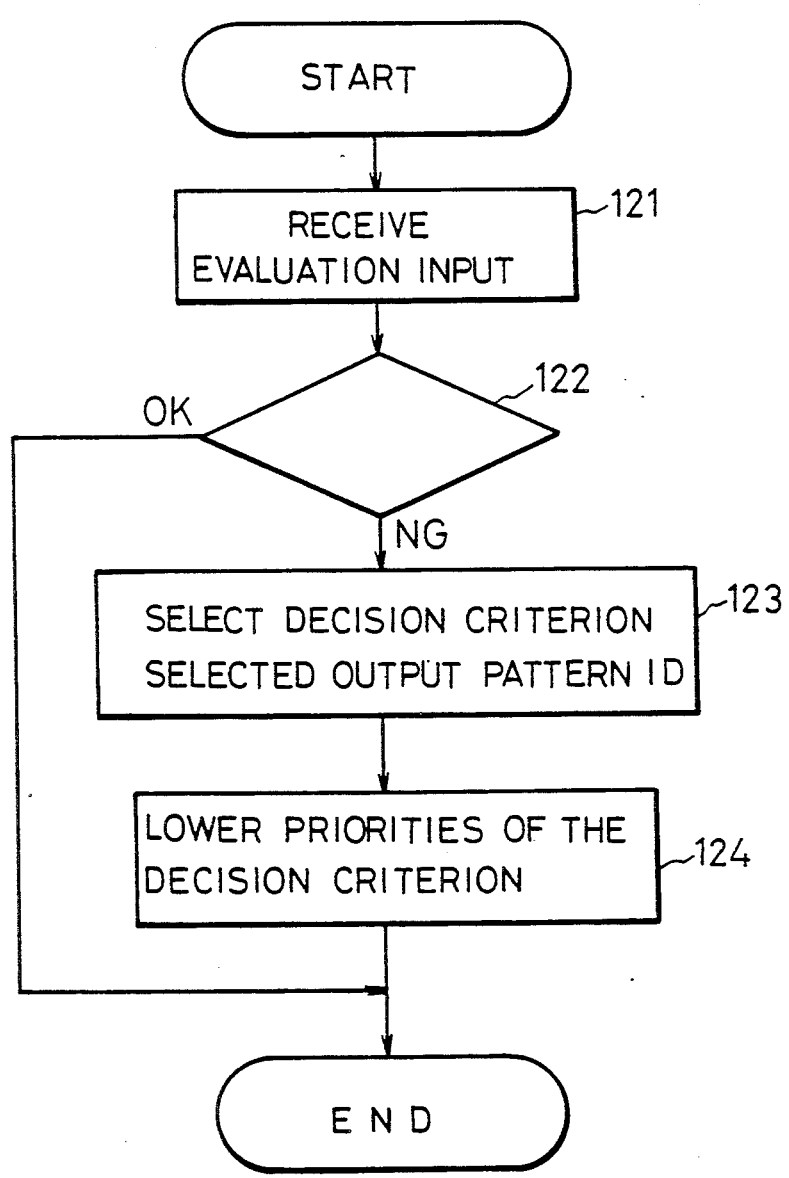
FIG. 12 is a flowchart outlining the operation of a decision reference changing section included in the executing subsystem.

More specifically, the reference changing section 66 has thereinside a storage which is loaded with decision criterion data (priority values in the illustrative embodiment). The section 66 increases the decision criterion data if the evaluation data 65 is positive and decreases them if the evaluation data 65 is negative. FIG. 12 shows a specific operation of the decision criterion changing section 66.

Figure 7:
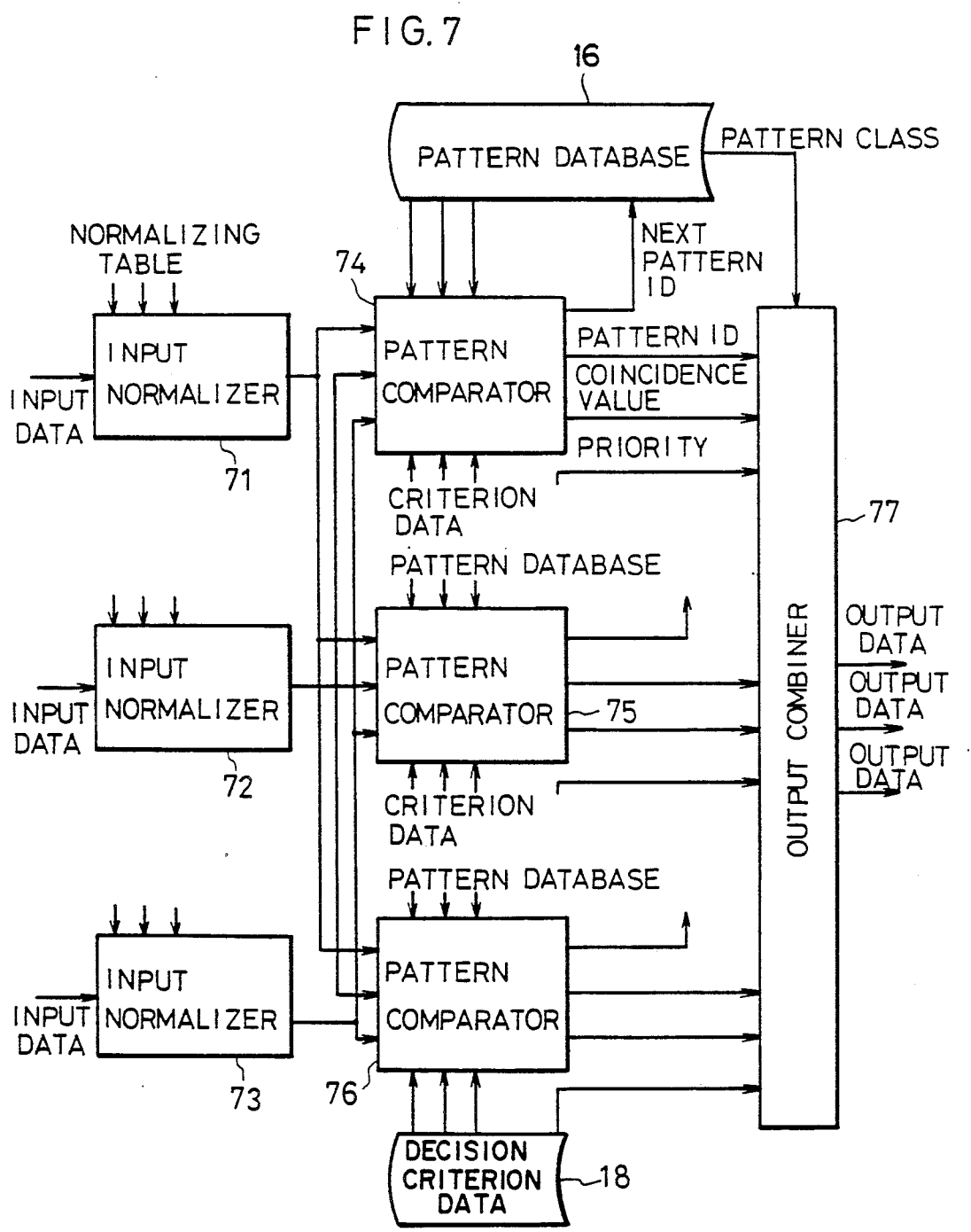
FIG. 7 is a schematic block diagram showing a specific construction of a pattern comparing section which is implemented by a plurality of pattern comparators in relation to a security system.

Referring to FIG. 7, a specific construction of the processor of the executing subsystem is shown which performs parallel processing for high-speed operations. In the processor, the input normalizing section 62 is implemented by a parallel connection of a plurality of input normalizers 71 to 73 which function as discussed above with reference to FIG. 9. The pattern comparing section 63 is constituted by a parallel connection of a plurality of pattern comparators 74 to 76. The output combining section 64 is comprised of a single output combiner 77 which function as discussed above with reference to FIG. 11. The input normalizers 71 to 73 and the pattern comparators 74 to 76 correspond in number to the input signals and the decision criterion data, respectively, promoting rapid operations by parallel processing. Respective input normalizers and respective pattern comparators are software modules and their normalizing functions and comparing functions can be realized by the combination of respective programs loaded to the internal storage and the processing unit or processor for executing the programs. It is noted that the pattern compare algorithm is comparatively simple, and it is easy for a person skilled in the art to realize the function by only hardware.

Figure 8:
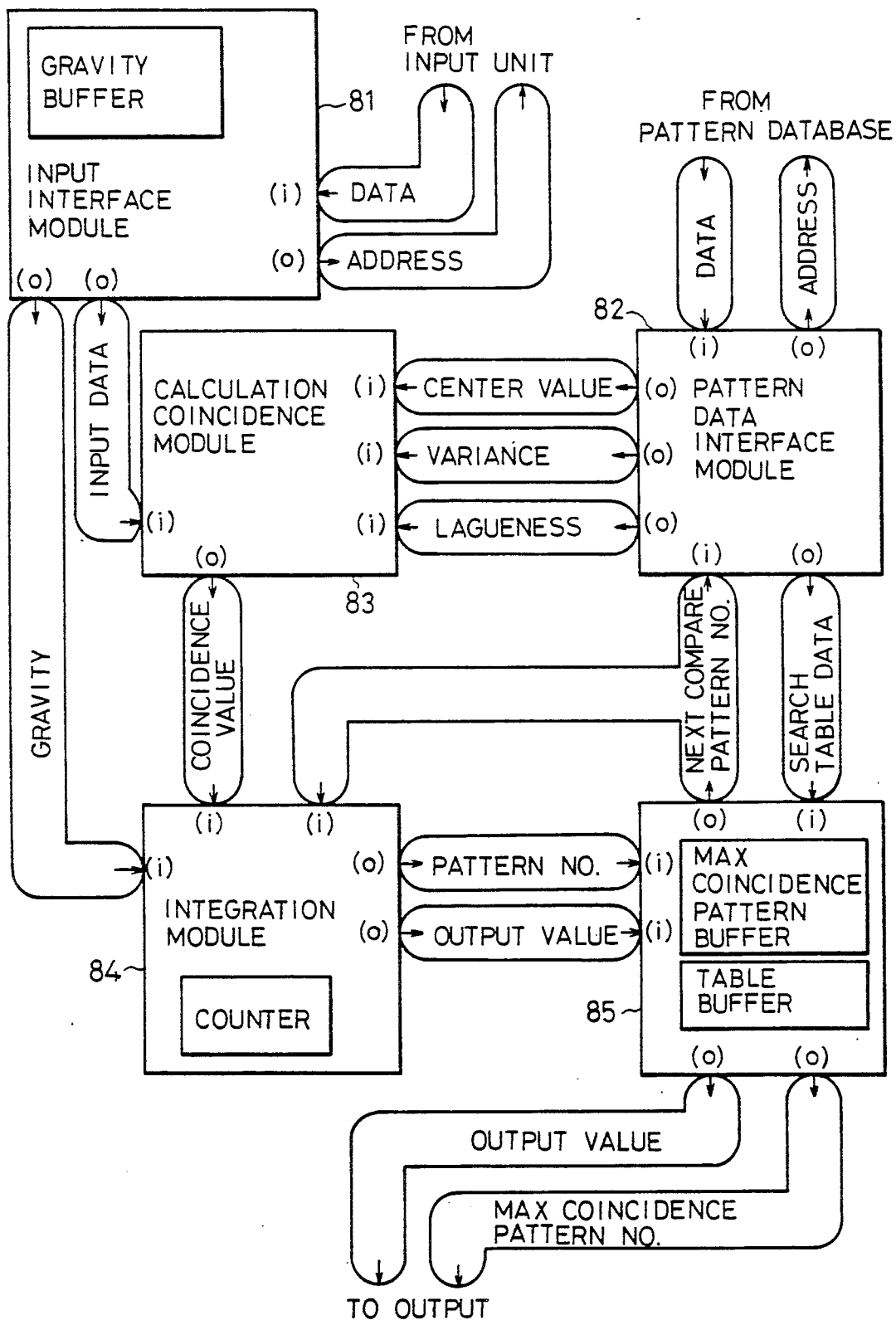
FIG. 8 is a schematic block diagram showing a specific construction of one of the pattern comparators shown in FIG. 7.

FIG. 8 shows a specific construction of one of the pattern comparators 74 to 76. As shown, the pattern comparator has an input value interface module 81, a coincidence value calculation module 83, and an integration module 84. At the time of initialization, the input value interface module 81 mainly reads gravities of decision criterion data and stores them in its internal buffer (gravity buffer). During execution, the module 81 sequentially reads input data to feed them to the coincidence value calculation module 83 while delivering the gravities from the gravity buffer to the integration module 84 sequentially. A pattern data interface module 82 is constructed to read, on the reception of a comparison pattern number from a pattern search module 85, search table data out of the pattern database 16 and delivers them to the pattern search module 85. During execution, the module 82 reads pattern data (center values, variances and vaguenesses) sequentially out of the pattern database 16 to transfer them to the coincidence value calculation module 83.

A major function of the coincidence calculation module 83 is reading input data and pattern data (center values, variances and vaguenesses), producing a comparison function by using the pattern data and original function, calculating coincidence values on based the input data fed thereto via the interface module 81 and the produced comparison function, and delivering them to the integration module 84.

The integration module 84 mainly clears an integration buffer and a counter buffer in the event of reception of a pattern from the pattern search module 85. During execution, the module 84 reads a coincidence value and a gravity out of the coincidence value calculation module 83 and the interface module 81, respectively, multiplies the coincidence value and gravity, integrates the resulting products and the gravity, increments counter data, and, when the counter data reaches the upper limit, transmits a pattern number, divides an integrated value of the results of multiplications by the integrated value of the gravities and sends data (output value) representative of the result of division to the pattern search module 85.

The pattern search module 85 chiefly functions on the reception of a pattern number to select patterns having the largest coincidence value and store them in the internal buffer, to select the next comparison patterns based on search tables stored in an internal buffer and transmit them to the pattern search interface 82, to read the search tables and store them in the internal buffer, and, when the next comparison patterns are particular patterns, transmit the patterns having the largest coincidence value and the coincidence value to the output combiner 77.

Figure 18:
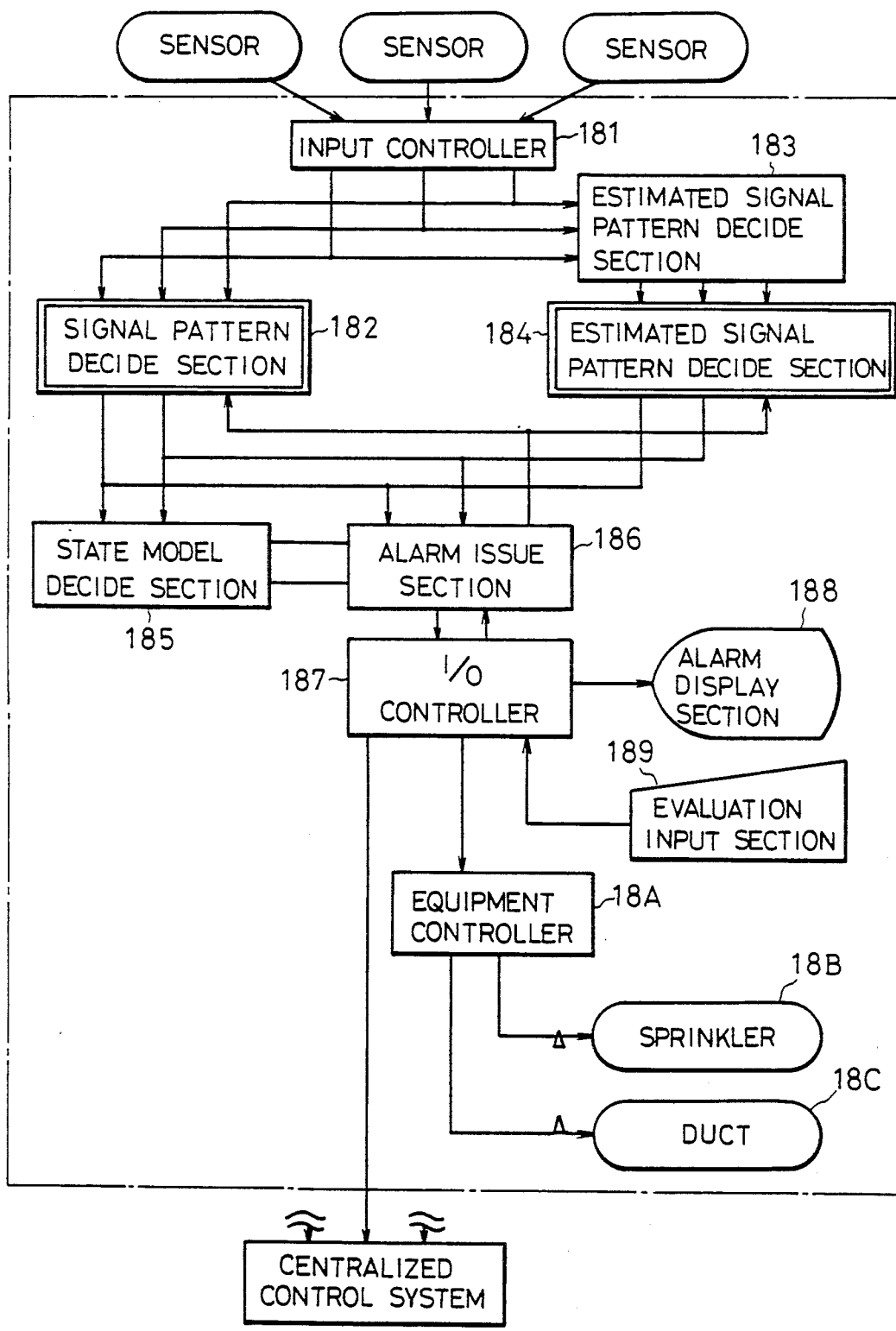
FIG. 18 is a schematic block diagram showing an alarm system (security system) implemented by the present invention.

Referring to FIG. 18, a specific arrangement of a security system to which the present invention is applied is shown. As shown, the security system has a signal pattern deciding section 182 and an estimated signal pattern deciding section 184 both of which are implemented by the knowledge compile-pattern reasoning system of the present invention. An input controller 181 converts electric signals fed thereto from sensors into numeral data (input patterns) and delivers them to the signal pattern deciding section 182 and an estimated pattern generating section 183. The signal pattern deciding section 182 compares the input patterns from the input controller 181 with patterns which it holds and are generated by the pattern generating subsystem, and delivers one of the patterns having a large coincidence value and the coincidence value to a state mode deciding section 185, alarm issuing section 186, etc. Further, the signal pattern deciding section 182 changes its own database in response to an evaluation fed thereto from an evaluation inputting section 189. This section 189 constitutes an alarm division in combination with the alarm issuing section 186, an input and output (I/O) controller 187, an alarm displaying section 188, etc.

Figure 19:
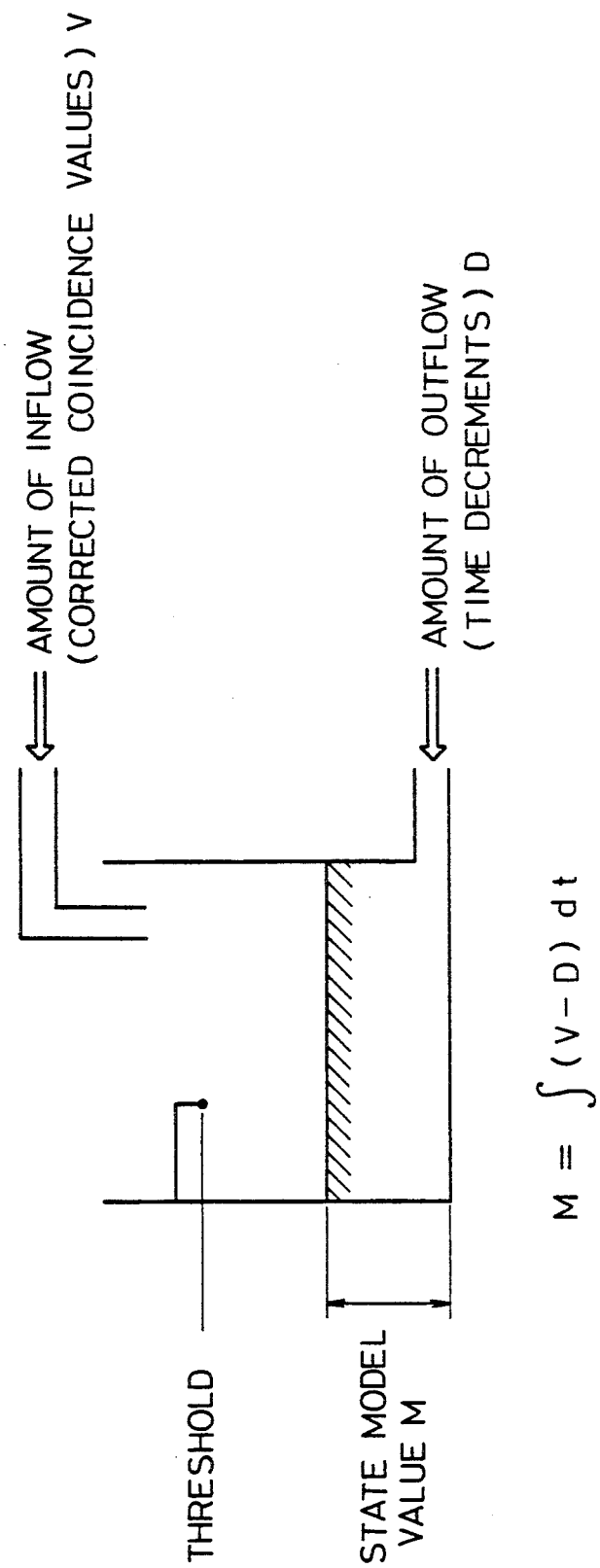
FIG. 19 is a diagram showing the operation of a state model deciding section of FIG. 18 sechematically.

The estimated pattern generating section 183 generates estimated patterns based on the history of the individual input patterns and applies them to the estimated signal pattern deciding section 184. In response, the estimated signal pattern deciding section 184 compares the estimated patterns with patterns which it holds and sends a pattern having a large coincidence value and the coincidence value to the state model deciding section 185. Further, the estimated signal pattern deciding section 184 modifies its own database in response to an evaluation from the evaluation inputting section 189. The state model deciding section 185 manipulates the state model values based on the signal pattern deciding section 182 and delivers the results to the alarm issuing section 186. In response to evaluation data from the alarm division, the state model deciding section 185 changes a database which it possesses. FIG. 19 indicates a state model. The state model deciding section 185 collects ambiguous data from the signal pattern deciding section 182 and estimated signal pattern deciding section 184 which will not result in an alarm, thereby analyzing the tendency.

The alarm issuing section 186 analyzes the instantaneous state in response to the data from the signal pattern deciding section 182, estimated signal pattern deciding section 184 and state model deciding section 185 and, if it is unusual, feeds alarm data to the I/O controller 187. When the alarm issuing section 186 receives evaluation data from the I/O controller 187, it sends evaluation data to the signal pattern deciding section 182, estimated pattern deciding section 184 and state model deciding section 185, depending on the primary cause of an alarm. The I/O controller 187 sends data to an alarm unit, an equipment controller 18A, and an upper layer system (centralized control system). In response to a command from the I/O controller 187, the equipment controller 18A feeds control commands to sprinklers, ducts and other emergency equipment which are installed in the area allocated to the security system.

In summary, it will be seen that the present invention provides a reasoning system which desirably interfaces human representation of knowledge and physical models and pattern data. This is derived from high-speed execution which is implemented by two subsystems, i.e., a pattern generating subsystem which interprets human representation of knowledge and physical models and transforms them into pattern data, and an executing subsystem which analyzes states by using decision criterion data.

Errors which may occur at the time of pattern generation and unpredictable changes in the subject environments can be accommodated by changing the decision criterion data of the executing subsystem. A section for comparing patterns can be readily implemented by hardware, and the high-speed operation with parallel processing is easy to realize. Further, when an output combining method using a characteristic function and a time delay function is adopted, the present invention is adaptable even to subjects having transitional characteristics.

Various modifications will become possible for those skilled in the art after receiving the teachings of the present disclosure without departing from the scope thereof.

What is claimed is:

1. A knowledge compilation/pattern reasoning system, comprising:
   a pattern generating subsystem for generating
      (a) state analysis pattern data including
         (a1) a comparision data sequence which describes a particular state based on a knowledge database, said knowledge database describing experiential knowledge and physical models necessary for analysis of a plurality of states, and
         (a2) search tables for determining a next comparison pattern, and
      (b) decision criterion data for state analysis composed of
         (b1) a first data sequence describing a decision characteristic associated with each of a plurality of input signals, and
         (b2) a second data sequence describing an output characteristic of each input signal; and
   an executing subsystem responsive to said plurality of input signals for analyzing said states by using the state analysis pattern data and the decision criterion data generated by said pattern generating subsystem, and said executing subsystem transmitting output signals matching said states,
   wherein said pattern generating subsystem includes
      a patterning rule generating section for determining, using data loaded in said knowledge database, (1) a format of patterns to be generated and (2) states which individual patterns indicate, and said pattern rule generating section for storing said determined format and states in a patterning rule database;
      a pattern data generating section for generating, by forward reasoning which uses the data loaded in said knowledge database, pattern data associated with the states which are indicated by the patterns stored in said patterning rule database, and said pattern data generating section for storing said pattern data in a pattern database; and
      a pattern data verifying section for verifying, by backward reasoning which uses the data loaded in said knowledge database, individual pattern data stored in said pattern data base, and if any of said pattern data is not verified, said pattern data verifying section correcting said pattern data.

2. A system as claimed in claim 1, wherein said executing subsystem comprises means for changing, when an evaluation associated with state analysis is produced, the criterion data in matching relation to said evaluation, wherein said system adapts to a change in state.

3. A system as claimed in claim 1, wherein the first and second data sequences of the decision criterion data are a function of a characteristic function describing a characteristic of the input signals and a time delay having time as a factor.

4. A knowledge compilation/pattern reasoning system, comprising:
   a pattern generating subsystem for generating
      (a) state analysis pattern data including
         (a1) a comparison data sequence which describes a particular state based on a knowledge database, said knowledge database describing experiential knowledge and physical models necessary for analysis of a plurality of states, and
         (a2) search tables for determining a next comparison pattern, and
      (b) decision criterion data for state analysis composed of
         (b1) a first data sequence describing a decision characteristic associated with each of a plurality of input signals, and
         (b2) a second data sequence describing an output characteristic of each input signal; and
   an executing subsystem responsive to said plurality of input signals for analyzing said states by using the state analysis pattern data and the decision criterion data generated by said pattern generating subsystem, and said executing subsystem transmitting output signals matching said states wherein said executing subsystem includes
      an input normalizing section for normalizing individual input data based on input data normalizing tables and for outputting said normalized input data;
      a pattern comparing section for sequentially calculating coincidence values by using (1) the normalized input data, (2) said comparison data sequence which is loaded in a pattern database generated by said pattern generating subsystem, said pattern data base is designated by said search tables which are described by pattern data, and (3) decision criterion data, and said pattern comparing section for outputting a pattern having a large coincidence value and said coincidence value;
      an output combining section for calculating corrected coincidence values, individually associated with coincidence values from said pattern comparing section, by using a characteristic function, a time delay function or similar correcting function, for selecting a pattern having a large coincidence value and a pattern class for said entire system by using said corrected coincidence values, and for calculating participation values representative of extents to which individual decision criterion data have influenced selection of the pattern and the pattern class; and a decision criterion changing section which is triggered upon input of evaluation data associated with output data of said output combining section, said decision criterion changing section for changing individual decision criterion data using (1) said evaluation data and (2) the participation values.

5. A system as claimed in claim 4, wherein said input normalizing section comprises input normalizers corresponding in number to said input signals and operable in parallel with each other;

said pattern comparing section comprising pattern comparators corresponding in number to the number of decision criteria data and operable in parallel with each other.

6. A knowledge compilation/pattern reasoning system according to claim 4 wherein said pattern comparing section comprises:

an input interface means for reading, during initialization, gravities of decision criterion data and, after initialization, sequentially reading input data to a coincidence value calculation means while sequentially outputting said gravities read during initialization to an integration means;

a pattern data interface means for reading, upon reception of a comparison pattern number from a pattern search means, search table data out of said pattern database for input to said pattern search means and, after initialization, sequentially reading said pattern data out of said pattern database for input to said coincidence value calculation means;

said coincidence value calculation means for generating a comparison function using the pattern data read via said pattern data interface means and an original function, for calculating coincidence values using the input data entered via said input interface means and said comparison function, and for outputting said coincidence values to said integration means;

said integration means having an integration buffer and counter buffer for clearing, upon reception of a comparison pattern number from said pattern search means, said integration buffer and said counter buffer and, after initialization, multiplying said coincidence values and said gravities read out of said coincidence value calculation means and said input interface means, respectively, for integrating results of multiplication and the gravities, for incrementing counter data, and, upon increment of the counter data to an upper limit, for transmitting a pattern number, for dividing an integrated value of the results of multiplication by an integrated value of the gravities, and for transmitting data representative of a result of division to said pattern search means; and said pattern search means for selecting, upon reception of a pattern number, a pattern having a largest coincidence value and for storing said pattern in an internal buffer, for selecting a next comparison pattern based on said search tables stored in an internal buffer and for transmitting said next comparison pattern to said pattern data interface means, and, when said next comparison pattern is a particular pattern, for outputting a number of a pattern having a largest coincidence value.

* * * * *